United States Patent
Jang et al.

(10) Patent No.: US 8,958,360 B2
(45) Date of Patent: Feb. 17, 2015

(54) COORDINATED COMMUNICATION METHOD USING MULTIPLE TERMINALS

(75) Inventors: Ji Woong Jang, Anyang-si (KR); Young Soo Yuk, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 13/577,625

(22) PCT Filed: Feb. 7, 2011

(86) PCT No.: PCT/KR2011/000779
§ 371 (c)(1),
(2), (4) Date: Aug. 7, 2012

(87) PCT Pub. No.: WO2011/096764
PCT Pub. Date: Aug. 11, 2011

(65) Prior Publication Data
US 2012/0300666 A1    Nov. 29, 2012

Related U.S. Application Data

(60) Provisional application No. 61/302,463, filed on Feb. 8, 2010, provisional application No. 61/302,467, filed on Feb. 8, 2010.

(51) Int. Cl.
*H04B 7/14* (2006.01)
*H04B 7/02* (2006.01)

(52) U.S. Cl.
CPC ..................................... *H04B 7/026* (2013.01)
USPC ......... 370/315; 370/252; 370/329; 455/422.1

(58) Field of Classification Search
CPC ...... H04B 7/14; H04B 7/12606; H04B 7/155; H04B 7/02; H04B 17/003; H04B 43/08; H04L 43/50; H04L 43/0852; H04W 72/04; H04W 88/08; H04W 88/04; H04W 52/02; H04W 52/0263; H04W 84/12; H04W 16/26; H04W 84/047
USPC ...................... 455/7, 550.1, 11.1, 422.1, 517; 375/141, 259, 267; 370/252, 329, 311, 370/315; 714/748
See application file for complete search history.

(56) References Cited

U.S. PATENT DOCUMENTS

2003/0148732 A1*  8/2003  Hunter et al. ................... 455/10
2007/0086512 A1    4/2007  Can et al.
(Continued)

FOREIGN PATENT DOCUMENTS

EP         2017973 A1    1/2009

OTHER PUBLICATIONS

"Coded Cooperation: A New Framework for User Cooperation in Wireless Networks", PhD EE Dissertation, University of Texas at Dallas, by Todd Edward Hunter, May 2004, pp. 19-22, 48-55.*

(Continued)

*Primary Examiner* — Bob Phunkulh
*Assistant Examiner* — Rose Clark
(74) *Attorney, Agent, or Firm* — Birch, Stewart, Kolasch & Birch, LLP

(57) ABSTRACT

A method including receiving a signal from a terminal; measuring channel state information (CSI); comparing the CSI to determine whether to decode the received signal; and if it is determined to decode the received signal, removing noise by decoding the received signal, and then performing decode and forward (DAF) in which the signal is re-encoded, and if it is determined not to decode the received signal, performing amplify and forward (AAF) in which the received signal is amplified. The CSI may be at least one of a frame error rate (FER), a bit error rate (BER), a signal to noise ratio (SNR), and a signal to interference plus noise ratio (SINR). Accordingly, a time delay consumed for channel decoding in hybrid DAF coordinated communication is decreased, data transmission and resource usage is more effectively achieved in coordinated communication using multiple terminals, and unnecessary power consumption is decreased.

3 Claims, 11 Drawing Sheets

(56) References Cited

U.S. PATENT DOCUMENTS

| | | | |
|---|---|---|---|
| 2008/0166975 A1* | 7/2008 | Kim et al. | 455/68 |
| 2009/0092072 A1* | 4/2009 | Imamura et al. | 370/315 |
| 2009/0175214 A1* | 7/2009 | Sfar et al. | 370/315 |
| 2009/0186645 A1 | 7/2009 | Jaturong et al. | |
| 2010/0323684 A1* | 12/2010 | Cai et al. | 455/422.1 |
| 2011/0075611 A1* | 3/2011 | Choi | 370/329 |
| 2011/0165835 A1* | 7/2011 | Horiuchi et al. | 455/7 |
| 2011/0255577 A1* | 10/2011 | Agee et al. | 375/219 |

OTHER PUBLICATIONS

Nosratinia, et al, "Cooperative Communication in Wireless Networks," IEEE Communications Magazine, Oct. 2004, pp. 74-80.*

* cited by examiner

COORDINATED COMMUNICATION METHOD USING MULTIPLE TERMINALS

CROSS REFERENCE TO RELATED APPLICATIONS

This application is the National Phase of PCT/KR2011/000779 filed on Feb. 7, 2011, which claims priority under 35 U.S.C. 119(e) to U.S. Provisional Application Nos. 61/302,463 and 61/302,467 both filed on Feb. 8, 2010, all of which are hereby expressly incorporated by reference into the present application.

TECHNICAL FIELD

The present invention relates to coordinated communications, and more particularly, to a method of performing coordinated communication using multiple terminals.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 500 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. A technology related to a relay station is one of main technologies for the LTE-advanced. The relay station is a device for relaying a signal between a base station and a terminal, and is used for cell coverage extension and throughput enhancement of a wireless communication system.

Further, in recent wireless communication system fields, there is ongoing research on performance improvement of a terminal located in a cell edge in a wireless communication system having a multi-cell structure. In particular, research on coordinated multiple-point transmission and reception (CoMP) is actively carried out. The CoMP is a technique for transmitting a signal through mutual cooperation between cells in the communication system having the multi-cell structure. According to the CoMP, a terminal, especially a terminal located in a cell edge, can communicate with a plurality of base station and thus can improve not only a transmit power gain but also signal sensitivity.

Representative methods of coordinated communication using multiple terminals include amplify and forward (AAF), demodulate and forward (DemAF), and decode and forward (DAF) methods. A hybrid DAF method is a method which combines these methods.

The hybrid DAF method determines whether to apply the DAF method and the AAF method according to whether decoding is successful after decoding a received signal. When operating in this manner, there is no problem in case of the DAF operation. However, in case of the AAF operation, there is a problem in that the AAF must be performed by storing the received signal until decoding of the received signal is complete to be able to know whether the decoding is successful. Once the received signal is stored, since the stored signal is not an analog signal but a digital signal obtained by quantizing the received signal, quantization noise may be added in a quantization process, and an additional storage space is required in a base station to store the signal. Therefore, it is actually impossible to apply the conventional hybrid DAF method in a format in which the AAF and the DAF are combined. Thus, when implemented in practice, the hybrid DAF method is implemented by combining the DAF and a modified DemAF in which a signal has multiple levels. Since the DemAF and the DAF both have a problem of error propagation, when implemented with the conventional hybrid DAF method, the error propagation problem still exists even if the hybrid DAF method is used.

Meanwhile, in coordinated communication using multiple terminals, a channel between a terminal which takes a relay role (hereinafter, such a terminal is referred to as a relay station) and a terminal which takes a source role may have better quality than a channel between the terminal and a base station, but it is a channel in which data must be protected by using a channel code or the like and in which an error may occur when the relay station cannot decode received data. In addition, according to a characteristic of most relay communication schemes which show optimal performance when the relay station is located at a middle point between the terminal and the base station, a part of data of the terminal is encoded and transmitted to the relay station, and the relay station decodes the data and re-encodes the data according to a situation of the relay station, and then transmits the data to the base station.

In the conventional coordinated communication, it is assumed a situation in which a channel environment is not significantly different between the terminal and the relay station or the base station. In particular, it is assumed a situation in which a channel environment between the terminal and the relay station is an environment which must use a channel code and a decoding error occurs in this environment. However, in most cases of coordinated communication, coordinated communication is made in general with a nearest terminal if possible under the condition that a channel in use is a channel having a small correlation between channels so as to obtain a diversity effect. Therefore, it can be assumed that a channel environment between the terminal and the relay station which participate in coordinated communication in a coordinated communication system is a clean environment in which an error does almost not occur even if a channel code is not present. Accordingly, there is a need for a method that performs coordinated communication without having to perform unnecessary decoding in such a situation.

SUMMARY OF INVENTION

Technical Problem

The present invention relates to a new hybrid transmission method for adapting to a channel situation in a coordinated communication system, and is provided to more effectively transmit data or use a resource when coordinated communication is performed by using multiple terminals.

Technical Solution

According to one aspect of the present invention, a method of performing coordinated communication by a relay station is provided. The method includes: receiving a signal from a terminal; measuring channel state information (CSI) indicating a state of a channel which receives the signal; comparing the CSI with a predetermined threshold to determine whether to decode the received signal; and if it is determined to decode the received signal, removing noise by decoding the received signal, and then performing decode and forward (DAF) in which the signal is re-encoded and transmitted to a base station, and if it is determined not to decode the received signal, performing amplify and forward (AAF) in which the received signal is amplified and forwarded to the base station.

In the aforementioned aspect of the present invention, the CSI may be at least one of a frame error rate (FER), a bit error rate (BER), a signal to noise ratio (SNR), and a signal to interference plus noise ratio (SINK).

In addition, the signal may be encoded into one of a low density parity check (LDPC) code, a turbo code, and a convolution code having a low code rate or a concatenated code of a block code different from the convolution code.

In addition, the method may further include operating an interference canceller when the signal is amplified and forwarded to the base station if it is determined not to decode the received signal.

In addition, if it is determined not to decode the received signal, when the signal is amplified and forwarded to the base station, a frequency at which the terminal performs reception may be different from a frequency at which the relay station performs transmission to the base station.

According to another aspect of the present invention, a method of performing coordinated communication by a relay station is provided. The method includes: receiving only a data part from a terminal through a first slot of a frame including the data part and a parity part; generating a second parity on the basis of information of the received data part; and transmitting the second parity to a base station through a second slot of the frame.

In the aforementioned aspect of the present invention, a delay part caused by a processing delay may be further included between the data part and the parity part.

In addition, if a time delay occurs when the second parity is generated, the time delay may be equal to the delay part caused by the processing delay.

In addition, when the second parity is transmitted to the base station through the second slot, information of the data part may be transmitted together.

In addition, the second parity may be generated at the same time of completing the reception of the data part through the first slot.

In addition, the relay station may transmit the second parity to the base station at the same time in which the terminal transmits information of the parity part to the base station.

In addition, when the data part is received through the first slot of the frame, the parity part may be further received, and the relay station may decode only the data part and generate the second parity on the basis of information of the decoded data part.

In addition, information of the parity part may be equal to the second parity.

In addition, information of the parity part may be different from the second parity.

Advantageous Effects

According to the present invention, a time delay consumed for channel decoding in hybrid decode and forward (DAF) coordinated communication can be decreased. Data transmission and resource usage can be more effectively achieved in coordinated communication using multiple terminals. Unnecessary power consumption can be decreased.

MODE FOR INVENTION

A method described hereinafter is also applicable to other systems such as institute of electrical and electronics engineers (IEEE) 802.11m as well as $3^{rd}$ generation partnership project (3GPP) long term evolution (LTE)/LTE-advanced (LTE-A).

Figure 1:
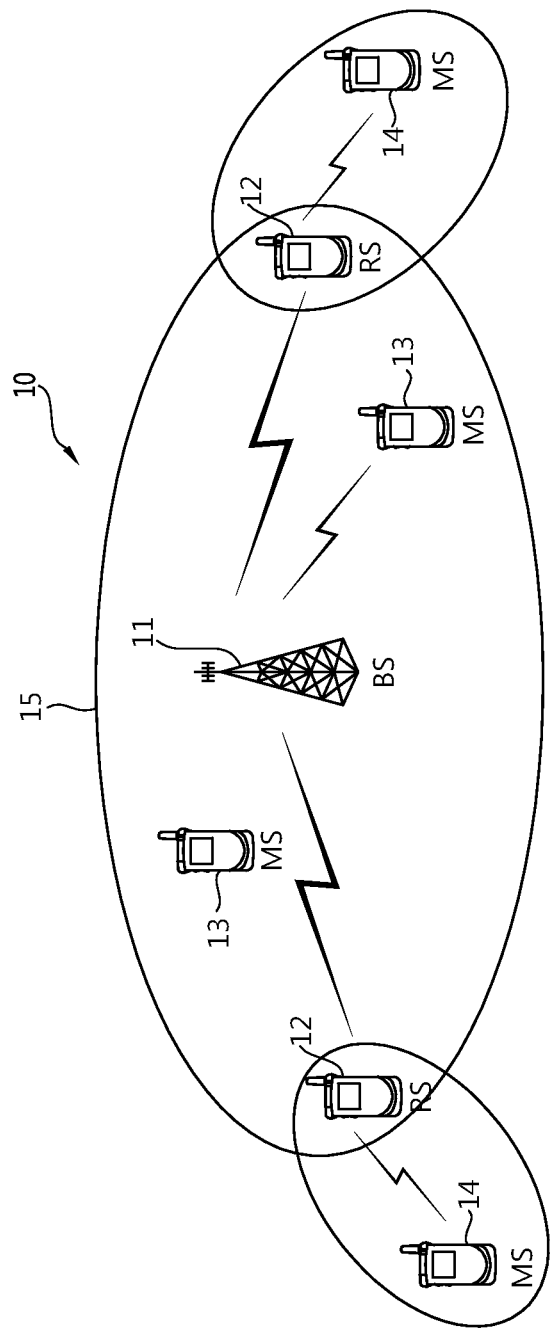
FIG. 1 shows a wireless communication system employing a relay station (RS).

FIG. 1 shows a wireless communication system employing a relay station (RS).

Referring to FIG. 1, the wireless communication system 10 employing the RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS.

The BS 11 is generally a fixed station that communicates with a user equipment (UE) 13 and may be referred to as another terminology, such as an evolved NodeB (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc. Further, the RS may be a UE or MS for taking a relay role or an entity corresponding thereto. That is, one UE may take a relay role between another UE and the BS to perform coordinated communication.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma UE) 13 denotes a UE that directly communicates with the BS 11, and a relay UE (or Re UE) 14 denotes a UE that communicates with the RS 12. Even if the Ma UE 13 exists in a cell of the BS 11, the Ma UE 13 can communicate with the BS 11 via the RS 12 to improve a data transfer rate depending on a diversity effect.

A downlink (DL) denotes communication from the BS 11 to the Ma UE 13. An uplink (UL) denotes communication from the Ma UE 13 to the BS 11. A backhaul link denotes a link between the BS 11 and the RS 12. A backhaul downlink denotes communication from the BS 11 to the RS 12. A backhaul uplink denotes communication from the RS 12 to the BS 11. An access link denotes a link between the RS 12 and the Re UE 14. An access downlink denotes communication from the RS 12 to the Re UE 14. An access uplink denotes communication from the Re UE 14 to the RS 12.

Figure 2:
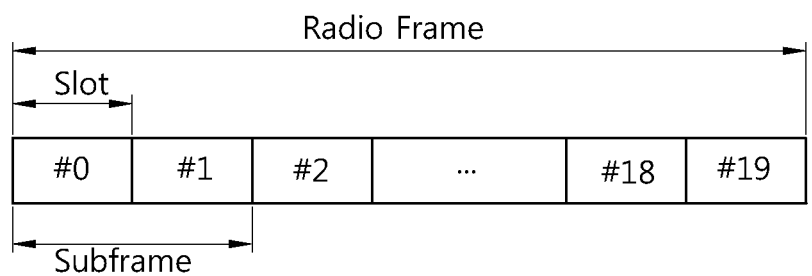
FIG. 2 shows a radio frame structure of $3^{rd}$ generation partnership project (3GPP) long term evolution (LTE).

FIG. 2 shows a radio frame structure of 3GPP LTE. The section 6 of 3GPP TS 36.211 V8.7.0 (2009-05) "Evolved Universal Terrestrial Radio Access (E-UTRA); Physical Channels and Modulation (Release 8)" can be incorporated herein by reference.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. The OFDM symbol is only for representing one symbol period in the time domain, and thus there is no restriction on multiple-access schemes or terminologies. For example, the OFDM symbol can also be referred to other terminologies such as a single carrier-frequency division multiple access (SC-TDMA) symbol, a symbol period, etc.

Although it is described for example that one slot includes 7 OFDM symbols, the number of OFDM symbols included in one symbol may change depending on a length of a cyclic prefix (CP). According to 3GPP TS 36.211 V8.7.0, one slot includes 7 OFDM symbols in a normal CP case, and one slot includes 6 OFDM symbols in an extended CP case.

The structure of the radio frame is for exemplary purposes only, and thus the number of subframes included in the radio frame and the number of slots included in the subframe may change variously.

Meanwhile, representative examples of the coordinated communication include amplify and forward (AAF), demodulate and forward (DemAF), and decode and forward (DAF).

Figure 3:
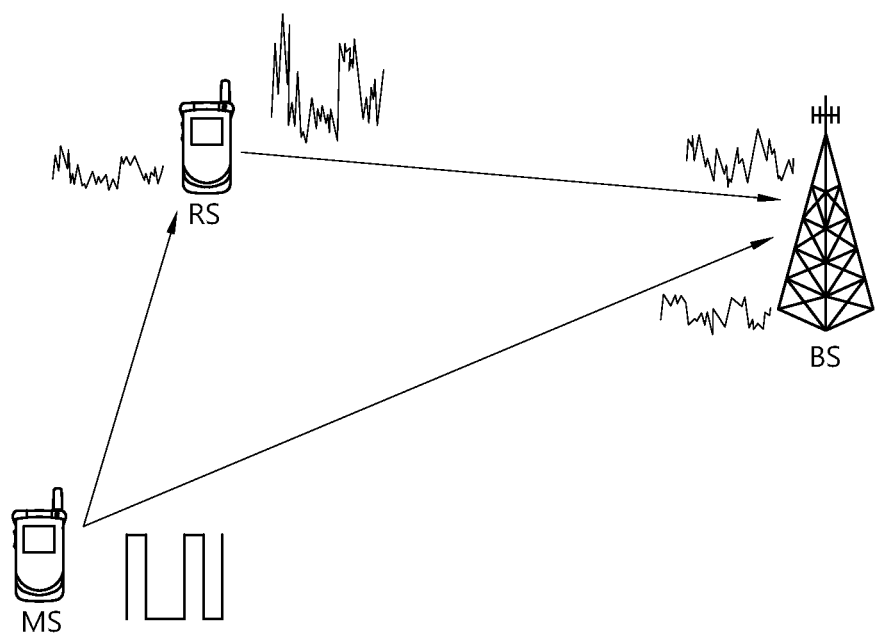
FIG. 3 shows an amplify and forward (AAF) coordinated communication method.

FIG. 3 shows an AAF coordinated communication method.

Referring to FIG. 3, in AAF, an RS simply amplifies data received from an MS and retransmits the data to a BS. When the RS transmits a signal by amplifying the signal, noise is also amplified.

In DemAF, the RS simply demodulates the received data, removes a noise component, and then retransmits the data.

Figure 4:
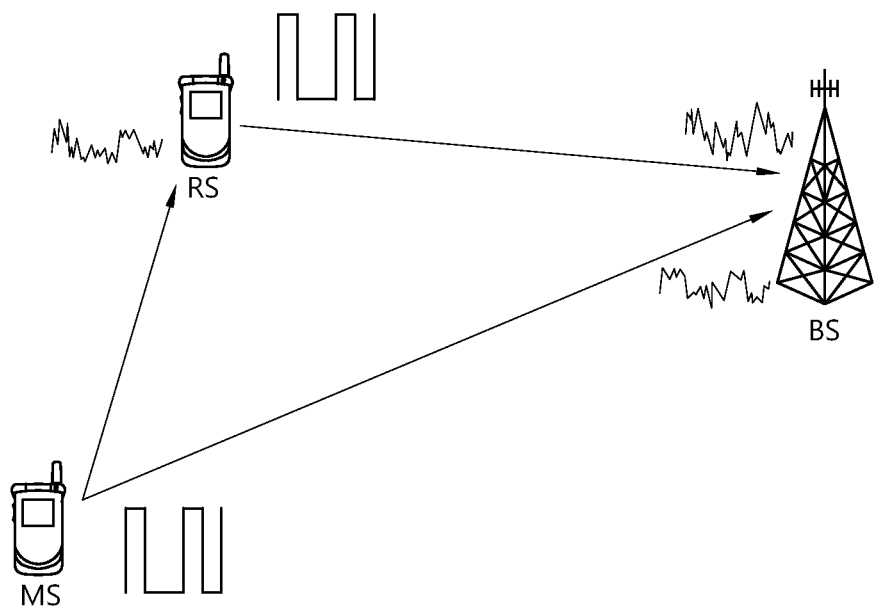
FIG. 4 shows a decode and forward (DAF) coordinated communication method.

FIG. 4 shows a DAF coordinated communication method.

Referring to FIG. 4, by proceeding one step further in comparison with the DeMAF, DAF is a method of decoding a channel code of a received data packet, re-encoding the channel code after correcting an error, and then transmitting the channel code to a BS. Unlike the AAF, since an RS transmits a signal to the BS by removing the noise, the DAF-type coordinated communication can solve the problem of the AAF in which noise is also amplified. However, if the RS fails to decode the signal due to a poor channel environment between an MS and the RS, the RS may transmit incorrect data to the BS and thus there may be an error propagation which results in greater error transmission than the conventional AAF.

Hereinafter, a hybrid DAF coordinated communication method according to the present invention will be described.

Hybrid DAF (HDAF) is a coordinated communication method which alternately uses AAF and DAF. The present invention assumes an environment capable of correctly determining a channel situation of a channel between an MS and an RS which are used in the coordinated communication. In addition, the present invention also assumes that a frame error rate (FER) of an error correction code applied to a communication system depending on the channel situation is known, and an FER value calculated previously and an FER value applied in an actual situation are identical in all channel situations.

Figure 5:
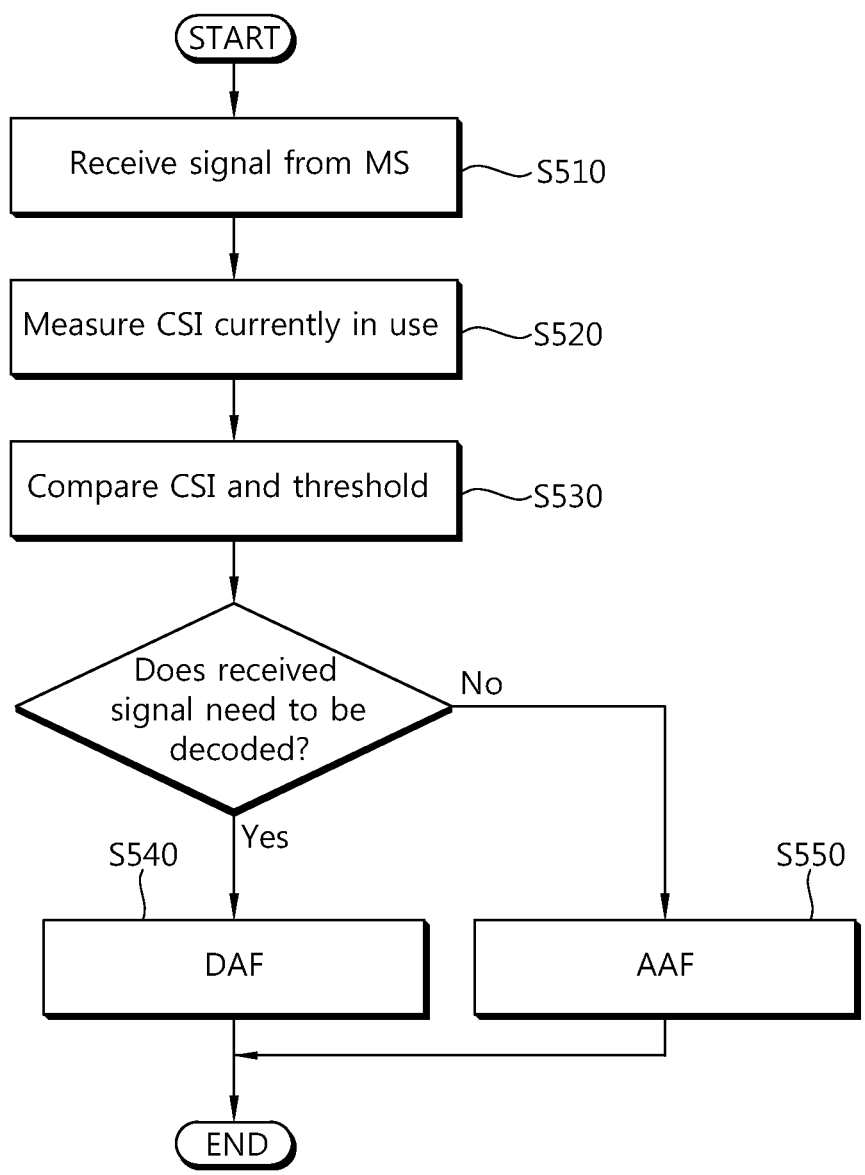
FIG. 5 is a flowchart showing hybrid DAF coordinated communication according to the present invention.

FIG. 5 is a flowchart showing hybrid DAF coordinated communication according to the present invention.

Referring to FIG. 5, an RS receives a signal from an MS (step S510). In this case, by measuring a pilot signal or an accumulated decoding result or the like of previously received data, the RS persistently measures channel state information (CSI) indicating a state of a channel which receives the signal currently being transmitted between the MS and the RS (step S520). By comparing the CSI with a predetermined threshold, it is determined whether to decode a channel code. In this case, whether to decode the channel code can be determined according to a bit error rate (BER), a frame error rate (FER), a signal to noise ratio (SNR) of a channel, a signal to interference plus noise ratio (SINR), a carrier to noise ratio (CNR), a carrier to interference plus noise ratio (CINR), or the like.

Whether to decode the channel code can be determined by comparing an FER of a signal with an FER table of a channel code applied to the system. However, if a received signal is decoded in any system, there is a characteristic in that the FER is determined in general according to an SNR of a channel. Although there may be a change depending on a type of a channel code in use and a parameter of the channel code, if variables such as the type of the channel code in use and the parameter of the channel code are fixed, the FER of the received signal is a function of CSI such as the SNR. Therefore, if the CSI can be known, whether the received signal is decodable can be determined to some extents even if the received signal is not directly decoded. Whether to decode a channel code applied to a current system can be determined by predetermining a threshold and by comparing the predetermined threshold with CSI of the received signal. If the CSI is greater than the threshold, it is determined to decode the channel code of the received signal, and if the CSI is less than the threshold, it is determined not to decode the channel code of the received signal.

If it is determined to decode the channel code of the received signal, decode and forward (DAF)-type coordinated communication is performed in such a manner that noise is removed by decoding the received signal and the signal is re-encoded and retransmitted (step S540). If it is determined not to decode the channel code, amplify and forward (AAF)-type coordinated communication is performed in such a manner that the received signal is directly amplified and forwarded (step S550).

Since the MS recognizes the CSI of the current channel, if the current CSI is enough to determine which scheme between the DAF and the AAF is applied to the received signal, a time delay for determining quality of the received signal does not occur.

Meanwhile, since the CSI is used as a reference for determining a transmission scheme to be applied to the system in the hybrid DAF coordinated communication according to the present invention, it is important for a relay station (RS) to accurately recognize channel information. That is, the more accurately the system can measure the CSI, the better the performance is. Since a probability of applying a proper transmission scheme is increased with respect to a threshold if there is a significant change in whether to decode the channel code applied to the system when determining whether to decode the channel code, a system using a high-quality channel code of which a graph showing a channel quality (e.g., an SNR or the like such as a low density parity check (LDPC) code or a turbo code) to FER performance has a great slope may show better performance.

Meanwhile, a unique method capable of controlling an MS taking a relay role, that is, an RS, by a BS is a method of transmitting a control signal. Therefore, when the BS intends to control the RS, information such as channel information or the like must be transmitted by the RS to the BS, and the BS must transmit a control signal for controlling the RS on the basis of the information. In such a process, information delivery and control signal transmission may result in the occurrence of a time delay, and there may be a case where the control of the BS is not suitable for an actual situation due to a change in a surrounding environment during the time delay. Therefore, the BS cannot perform the control of the BS to optimize performance or a level of interference that occurs around the RS.

In this case, if the BS can perform a certain configuration with respect to the RS, a side effect which may possibly occur can be decreased and a network can be optimized. For example, it can be defined such that the BS can selectively determine one of modes among the AAF, the DemAF, and the DAF. Alternatively, the RS can be controlled by predetermining a threshold at which a mode change can occur among the AAF, the DemAF, and the DAF.

Further, since the AAF or the DemAF has a structure in which a reception signal is directly transmitted, there is a possibility that mutual interference occurs between transmission (Tx)/reception (Rx) signals. Thus, a relay may be performed by operating a robust interference canceller or by using different frequencies. That is, a frequency at which the MS performs reception and a carrier transmitted by the RS to the BS may be allowed to be changed or a Tx frequency band may be allowed to be changed. If the Tx frequency band or the carrier is changed, the interference canceller is not a great constraint and a relay functionality can be smoothly implemented. In addition, the BS can be allowed to transmit a signal only to the RS by significantly decreasing power transmitted by the MS.

On the other hand, it is possible to have a structure in which power of the MS is great and a relayed signal also occupies a band. However, when considering efficiency in terms of a frequency usage aspect, it is also possible to consider a structure in which the MS consumes power only to an extent of being transmitted to the RS and a signal transmitted by the RS is delivered to the BS.

The hybrid DAF coordinated communication according to the present invention can solve a problem in that implementation of the DAF is difficult due to a time delay consumed for channel decoding if the DAF is performed at the occurrence of failure in the decoding of a channel code. In addition, since there is no time delay in case of operating in the AAF mode, an average time delay is decreased in comparison with the conventional hybrid DAF, and there is no quantization noise in case of operating in the AAF mode. Further, since it is possible to regulate a CSI value which is used as a reference suitable for a channel situation or system QoS, the system can be easily controlled based on the QoS and thus the BS can easily control the RS.

The present invention described hereinafter relates to a method of efficiently performing cooperative communication by using an MS which takes a role of an RS in a cooperative communication system. This method relates to a method of efficiently transmitting data and using a resource when a plurality of MSs are used in cooperative communication. The better the channel situation between an MS which takes a role of an RS (hereinafter, such an MS is referred to as an RS) and an MS which takes a role of a source, and the less the correlation of a channel situation between an MS and a BS or between an RS and a BS, the better the result is obtained in the cooperative communication method according to the present invention. If a data frame structure satisfies a basic condition, this method is applicable to any system.

Figure 6:
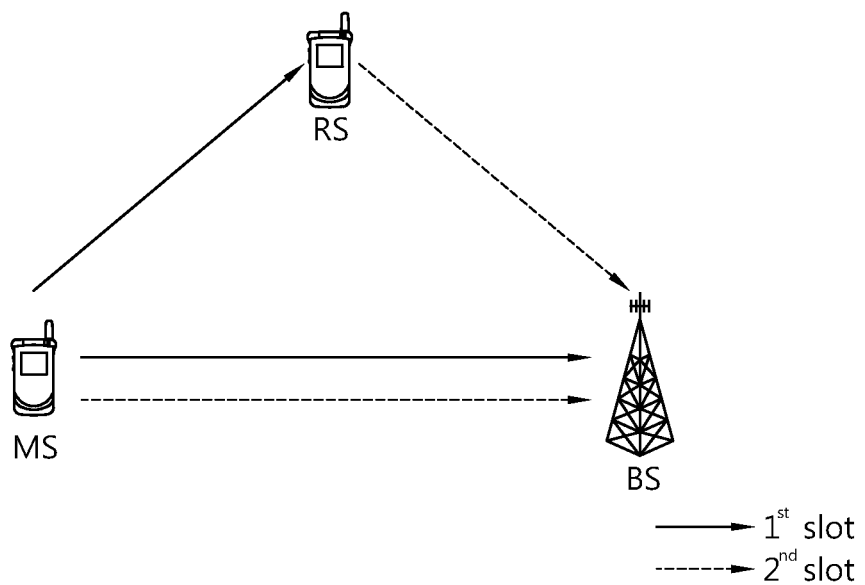
FIG. 6 shows an example of a coordinated communication system using an RS.

FIG. 6 shows an example of a cooperative communication system using an RS.

Referring to FIG. 6, a channel between an MS and an RS has better quality than a channel between the MS and a BS, but is a channel in which data must be protected by using a channel code or the like and in which an error may occur when the RS cannot decode received data. In addition, according to a characteristic of most cooperative communication schemes which show optimal performance when the RS is located at a middle point between the MS and the BS, data of the MS is partially encoded and transmitted to the RS, and the RS decodes the data and re-encodes the data according to a situation of the RS, and then transmits the data to the BS.

In the conventional cooperative communication, it is assumed a situation in which a channel environment between the MS and the RS is an environment which must use a channel code and a decoding error occurs in this environment. However, in most cases of an actual cooperative communication situation, cooperative communication is made in general with a nearest MS if possible under the condition that a channel in use is a channel having a small correlation between channels so as to obtain a diversity effect. Therefore, it can be assumed that a channel environment between the MS and the RS which participate in cooperative communication in an actual cooperative communication system is a clean environment in which an error does almost not occur even if a channel code is not present. If such an environment is not assumed, the channel code is decoded when communication is performed between the MS and the RS, which causes waste of various resources and a time delay depending on decoding of the channel code, thereby decreasing efficiency of data transmission.

Figure 7:
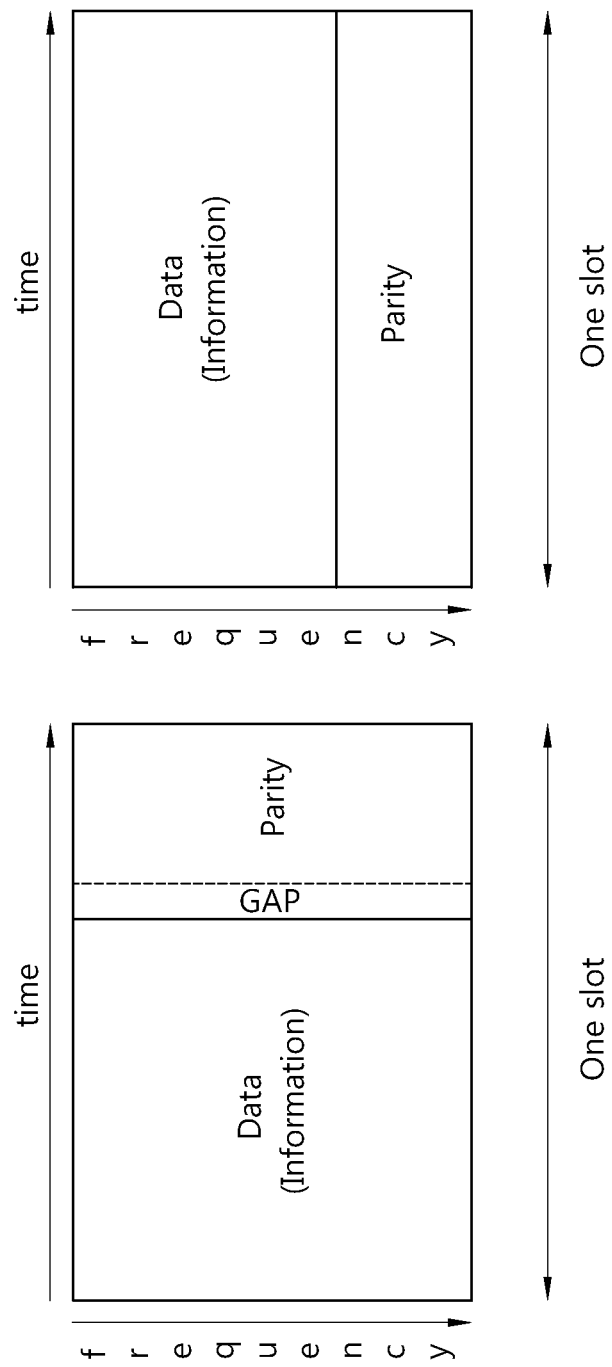
FIG. 7 shows a structure of a data frame transmitted by using a coordinated communication method according to the present invention.

FIG. 7 shows a structure of a data frame transmitted by using a cooperative communication method according to the present invention. First, it is assumed that a distance between an MS and an RS used in cooperative communication is very close and thus a channel state is good enough such that an error does not occur in data transmission/reception even if an error correction code is not used in a channel between the MS and the RS.

Referring to FIG. 7, the data frame may have a structure in which an information part and parity part of a codeword are separated on the frame according to a time domain or a frequency domain. A time axis may represent one slot and may be a one-time transmission unit. The parity part takes a role for error correction.

If it is assumed that any two transmission units perform mutual cooperative transmission, the information part corresponds to traffic of one MS, i.e., a data source which intents to perform initial transmission. In this case, the number of transmission entities may be one. However, in case of the parity part, transmission can be performed simultaneously by two or more MSs which perform mutual cooperative communication. In this case, a time point at which cooperative communication starts may vary depending on a processing delay of the MS (see a GAP part of FIG. 7). In order to decrease the processing delay and to maintain log-likelihood ratio (LLR) constantly, systematic information may be retransmitted in the GAP part. It may be preferable to transmit the systematic information, but the present invention is not limited thereto. That is, from the perspective of the MS which performs initial transmission, the information part can be repetitively added simply and the parity part can be concatenated and transmitted. However, the MS which performs cooperative communication can confirm data integrity by directly using the information part (herein, an error protection code such as a cyclic redundancy check (CRC) is used), and if an error is not detected, the parity part can be transmitted by generating a parity signal in a similar format or the same format as that generated by the data source by using channel encoding.

If a processing delay is expected, the MS which performs cooperative communication must make the cooperative communication valid at a possible timing location without the aid of other elements, and can transmit the parity part only at a time point defined as a confirmed location or coordinated location between MSs.

In order to allow each transmission unit (e.g., a transmission unit of an orthogonal frequency division multiplexing (OFDM) symbol) to know that transmission is performed simultaneously by several entities, a reference symbol is preferably defined in a format of being included in each transmission unit or tag information of the MS is preferably transmitted independently from a parity. For this, a tag channel may insert specific pattern information in a part for transmitting the parity, or may be defined as an overlaid, or may be defined through a separate indication channel.

In doing so, in a single time slot in which the data source transmits a packet, entities for performing cooperative communication can perform both data reception and cooperative transmission. In this case, data transmission can be characterized in that the information part and the parity part are separately transmitted. In such a structure, the entities for performing cooperative transmission become a state of directly making a decision and generating a parity by using only the information part. In particular, if it is assumed that a channel between the entities for performing cooperative transmission is significantly good, a large latency of a channel decoding process is not included since there is a high possibility that reception is successful even if only the information part is received without channel encoding.

If a codeword in the data frame is distinctively separated according to a time domain or a frequency domain, cooperative communication can be performed in a manner of adjusting a data part received by an RS in uplink.

Figure 8:
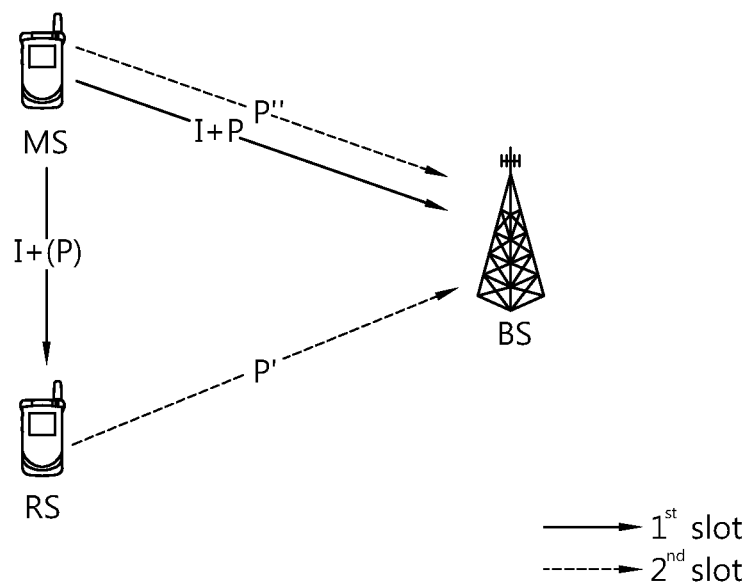
FIG. 8 shows a data transmission method of coordinated communication according to the present invention.

FIG. 8 shows a data transmission method of cooperative communication according to the present invention.

Referring to FIG. 8, in $1^{st}$ communication using a $1^{st}$ slot, an MS broadcasts a full frame including data I and a parity P respectively to an RS and a BS which participate in cooperative communication. In this case, the BS receives both the data I and the parity P, whereas the RS receives only the I part and does not receive the P part in a transmitted frame. Alternatively, the RS may receive both the data (I) part and the parity (P) part while decoding only the I part. That is, since the data and the parity are completely separated, after receiving the full frame including both the I part and the P part, only data of the I part can be collected without a process of decoding a channel code and can be used in a transmission process to be performed later. If it is assumed a channel which does not require a channel code as a prerequisite condition, it is possible to collect data as described above.

Upon receiving the data I in the $1^{st}$ transmission, the RS generates a new $2^{nd}$ parity P' from the received data I and then transmits the $2^{nd}$ parity P' to the BS in $2^{nd}$ transmission using a $2^{nd}$ slot. At the same time, the MS generates a new $3^{rd}$ parity P''' with respect to the old data I and transmits the $3^{rd}$ parity P''' to the BS. In this case, the $2^{nd}$ parity P' generated by the RS is not necessarily different from the parity P generated by the MS for the $1^{st}$ transmission and the $3^{rd}$ parity P''' generated by the MS for the $2^{nd}$ transmission, and thus the parities may be identical to each other.

Figure 9:
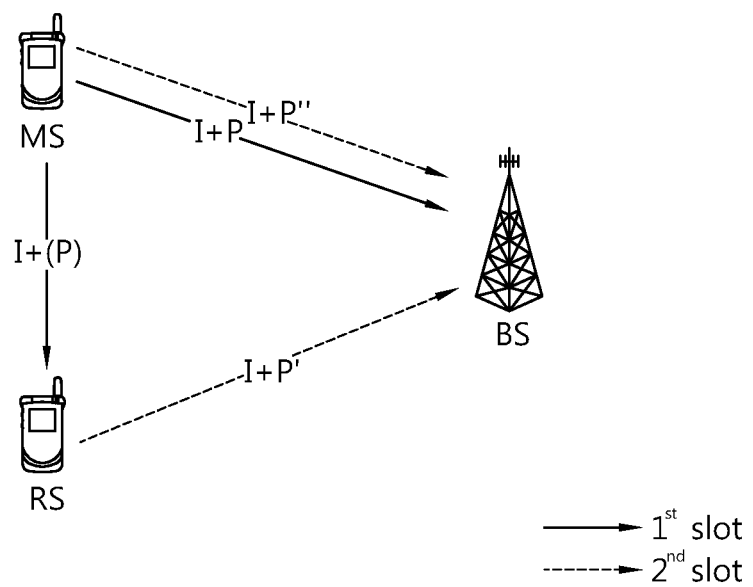
FIG. 9 shows another example of a coordinated communication transmission method according to the present invention.

FIG. 9 shows another example of a cooperative communication transmission method according to the present invention.

Referring to FIG. 9, when an RS performs $2^{nd}$ transmission to a BS through a $2^{nd}$ slot, data I can be transmitted together with a new $2^{nd}$ parity P' to the BS. Also, instead of transmitting only $3^{rd}$ parity P''', an MS can also transmit the parity together with the data I. The present invention can be applied according to a system and channel condition.

Figure 10:
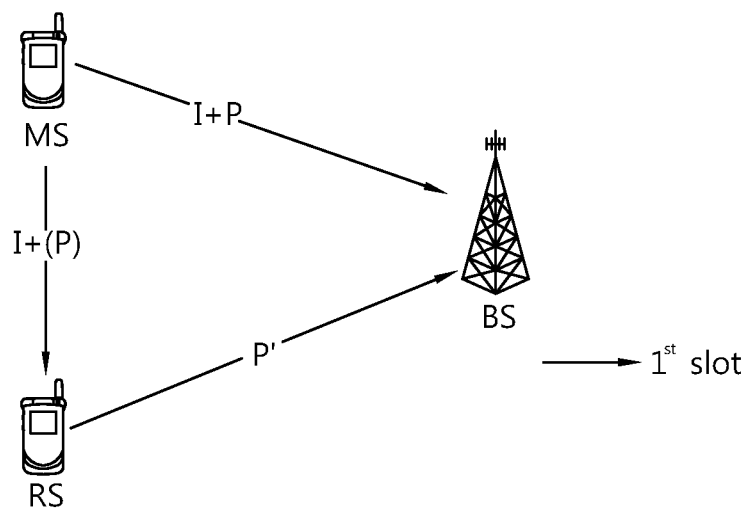
FIG. 10 shows another example of a coordinated communication transmission method according to the present invention.

FIG. 10 shows another example of a cooperative communication transmission method according to the present invention.

Referring to FIG. 10, in transmission of an MS, an RS receives only a data (I) part of a transmitted frame. Generation of a parity P' starts as soon as the RS completes the reception of the I part. A parity P can be generated without an additional time delay immediately after data reception is complete according to a characteristic of a typical channel code. Therefore, the $2^{nd}$ parity P' generated by the RS can be transmitted to a BS at the same time in which the MS transmits a parity (P) part to the BS. By applying such a frame processing method, transmission of cooperative communication can be complete in one time slot.

In a case where a small time delay occurs when the RS calculates the second parity by inserting the same time delay as that consumed to generate the second parity P' in the RS between the I part and P part of the MS, transmission of cooperative communication can be complete with a shorter time than the conventional cooperative communication scheme.

In addition, since less than two slots are used to finish transmission of cooperative communication, a transmission delay can be decreased in comparison with the conventional scheme or the delay itself can be removed.

When performing cooperative communication according to the present invention, the RS receives data by using only a resource (i.e., a time or frequency band) corresponding to the data I in the full frame transmitted by the MS, and thus the resource previously used to receive the parity can be used for other usages. In addition, since the RS does not have a process for decoding an error correction code, power consumption used to decode the error correction code can be decreased, and a time required for decoding and an additional resource such as a memory used as a buffer are not necessary. In particular, the transmission delay caused by a time consumed for decoding may have a direct effect on overall system performance deterioration according to a characteristic of wireless communications. Since the RS does not have the decoding process, a hardware structure of the RS can be more simple and transmission synchronization or the like can be more easy, thereby being able to improve overall system performance.

Figure 11:
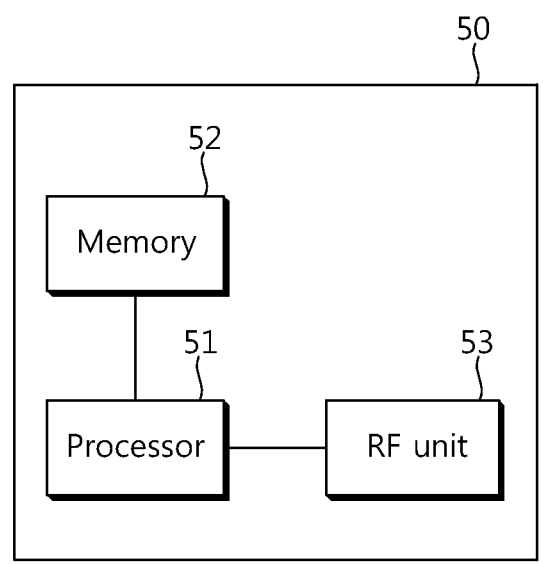
FIG. 11 is a block diagram showing a wireless communication system according to an embodiment of the present invention.

FIG. 11 is a block diagram showing a wireless communication system according to an embodiment of the present invention.

An RS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal.

The processor 51 implements the functions, procedures, and/or methods according to the present invention. The processor 51 can perform cooperative communication on the basis of the embodiments of FIG. 3 to FIG. 10 or combinations thereof. That is, the processor receives a signal from an MS, acquires CSI indicating a state of a channel for receiving the signal, determines whether to decode the received signal by comparing the CSI with a predetermined threshold, and if it is determined to decode the received signal, removes noise by decoding the received signal and then transmits the signal to a BS by re-encoding the signal, and if it is determined not to decode the received signal, transmits the received signal to the BS by amplifying the received signal.

Further, through a $1^{st}$ slot of a frame including an information part and a parity part, the processor can receive only the information part from the MS. The processor can generate a $2^{nd}$ parity on the basis of information on the received information part, and can transmit the $2^{nd}$ parity to the BS through a $2^{nd}$ slot of the frame.

In addition, the processor may be a microprocessor, a controller, a micro controller, an application specific integrated circuit (ASIC), etc., depending on a software or program code which is coded to perform the aforementioned function.

The processor may include an ASIC, a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for handling a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of performing coordinated communication by a relay station, the method comprising:
   receiving a signal from a terminal,
   wherein the signal is encoded into a low density parity check (LDPC) code;
   measuring channel state information (CSI) indicating a state of a channel which receives the signal;
   comparing the CSI with a predetermined threshold to determine whether to decode the received signal;
   when it is determined to decode the received signal, removing noise by decoding the received signal, and then performing decode and forward (DAF) in which the signal is re-encoded and transmitted to a base station, and when it is determined not to decode the received signal, performing amplify and forward (AAF) in which the received signal is amplified and forwarded to the base station,
   wherein an interference canceller is operated when the signal is amplified and forwarded to the base station; and
   determining a frame error rate (FER), a bit error rate (BER), a signal to noise ratio (SNR), and a signal to interference plus noise ratio (SINR),
   wherein the FER is determined according to the SNR, and compared with an FER table of the LDPC code, and
   wherein the CSI is at least one of the FER, the BER, the SNR, and the SINR.

2. The method of claim 1, wherein the CSI is at least one of a frame error rate (FER), a bit error rate (BER), a signal to noise ratio (SNR), and a signal to interference plus noise ratio (SINR).

3. The method of claim 1, wherein if it is determined not to decode the received signal, when the signal is amplified and forwarded to the base station, a frequency at which the terminal performs reception is different from a frequency at which the relay station performs transmission to the base station.

* * * * *